US006705329B1

(12) United States Patent
Usui

(10) Patent No.: US 6,705,329 B1
(45) Date of Patent: Mar. 16, 2004

(54) METHOD OF MANUFACTURING HIGH-PRESSURE FUEL INJECTION PIPE FOR INTERNAL COMBUSTION ENGINE

(75) Inventor: Masayoshi Usui, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 08/871,518

(22) Filed: Jun. 9, 1997

(51) Int. Cl.[7] ............................ B08B 9/02; B23P 15/00

(52) U.S. Cl. ................................ 134/22.14; 134/22.11; 29/526.6; 29/527.6

(58) Field of Search ....................... 134/2, 22.11, 22.13, 134/22.14, 22.17, 22.19, 28, 41; 29/526.5, 526.6, 527.6

(56) References Cited

U.S. PATENT DOCUMENTS

| | | | | | |
|---|---|---|---|---|---|
| 1,211,138 | A | * | 1/1917 | Gravell | 134/28 X |
| 1,279,331 | A | * | 9/1918 | Gravell | 134/28 X |
| 1,554,483 | A | * | 9/1925 | Balley et al. | 134/28 X |
| 1,831,091 | A | * | 11/1931 | Bowers | 134/28 X |
| 1,859,734 | A | * | 5/1932 | George | 134/28 X |
| 1,892,093 | A | * | 12/1932 | Barristella | 134/28 X |
| 2,832,703 | A | * | 4/1958 | Bell et al. | 134/22.17 |
| 2,965,523 | A | * | 12/1960 | Engle | 134/27 |
| 5,315,904 | A | * | 5/1994 | Hashimoto et al. | 408/62 |
| 5,339,513 | A | * | 8/1994 | Hashimoto et al. | 29/526.6 |

* cited by examiner

*Primary Examiner*—Randy Gulakowski
*Assistant Examiner*—Saeed Chaudhry
(74) *Attorney, Agent, or Firm*—Anthony J. Casella; Gerald E. Hespos

(57) ABSTRACT

The present invention provides a method of manufacturing a high-pressure fuel injection pipe in which various foreign particles are substantially completely eliminated from the inner circumferential surface of a high-pressure fuel injection pipe. The method of manufacturing a high-pressure fuel injection pipe is characterized in that the inner circumferential surface of a metal pipe having a large wall thickness and a small diameter is cleaned using a solvent for dissolving foreign particles comprising an acid, alkali or organic solvent after a final pipe-extending step among steps for manufacturing the metal pipe.

11 Claims, No Drawings

METHOD OF MANUFACTURING HIGH-PRESSURE FUEL INJECTION PIPE FOR INTERNAL COMBUSTION ENGINE

BACKGROUND OF THE INVENTION

1. Field of the Invention

The present invention relates to a high-pressure fuel injection pipe having a small outer diameter in the range from 4.5 to 20.0 mm and a large wall thickness in the range from 1.5 to 8.0 mm and a method of manufacturing the same and, more particularly, to a method of manufacturing a high-pressure fuel injection pipe used in a diesel internal combustion engine.

In the present specification, the term "high-pressure fuel injection pipe" is a general term which implies not only pipe materials for high-pressure injection pipes before formation of a head portion at a connecting end thereof but also materials which have been formed with such a head portion and materials which have been bent after the formation of a head portion and, further, so-called common rails serving as a pressure accumulation chamber for accumulating the pressure of fuel which has been pressurized in advance using a high-pressure pump and for supplying the fuel to a combustion chamber via a mechanically or electrically controlled valve.

2. Description of the Prior Art

Recently, there is an accelerating trend toward an increase in the pressure of fuel to be supplied to a high pressure fuel injection pipe used as a fuel injection pipe for a diesel engine as a measure for reducing NOx and black smoke, and this has resulted in a need for fuel injection for an injection period of 1 to 2 msec., at a maximum flow rate of 50 m/sec. and at a high internal pressure in the range from 60 to 1500 bar (peak value).

Such a change in market demands is accompanied by an increased possibility of clogging of an injection nozzle caused by foreign particles such as metal particles which have stuck to the inner surface of a high-pressure fuel injection pipe after floating in the air or entering from the outside, and this can cause a faulty operation of a diesel engine or damage to a fuel pump. Thus, it is an important problem to be solved to improve the cleanness of the inner surface of a high-pressure fuel injection pipe in order to prevent this.

In conventional steps of manufacturing a high-pressure fuel injection pipe, foreign particles that enter such an injection pipe and stick to the inner circumferential surface thereof have been cleaned by simply blowing them off with high-pressure air. However, this has not provided for sufficient cleaning and still has left a possibility of clogging of an injection nozzle which leads to a faulty operation of a diesel engine and damage to a fuel injection pump. Under such circumstances, there is a need for further improvement.

SUMMARY OF THE INVENTION

The present invention has been conceived in consideration to the above-described situation of this type of high-pressure fuel injection pipe, and it is an object of the present invention to provide a method of manufacturing a high-pressure fuel injection pipe in which the cleanness of the inner surface of a high-pressure fuel injection pipe can be improved by substantially completely eliminating various foreign particles from the inner circumferential surface thereof to prevent the occurrence of clogging of an injection nozzle and to thereby prevent a faulty operation of a diesel engine and damage to a fuel pump.

In order to achieve the above-described object, according to the present invention, there is provided a method of manufacturing a high-pressure fuel injection pipe characterized in that steps of manufacturing a metal pipe having a large wall thickness and a small diameter include cleaning utilizing a solvent for dissolving foreign particles that follows a final pipe-extending step. The above-mentioned solvent for dissolving foreign particles is preferably an acid, alkaline or organic solvent, and such cleaning utilizing the solvent for dissolving foreign particles is preferably repeated a plurality of times utilizing different kinds of solvents or the same kind of solvent.

DETAILED DESCRIPTION OF THE INVENTION

According to the present invention, a pipe-extending process and a heating process are repeated four to six times to manufacture a high-pressure fuel injection pipe as normally done. After a final pipe-extending step, the inner circumferential surface is cleaned using a solvent for dissolving foreign particles. Acid type solvents such as phosphoric acid type solvents and oxalic acid-hydrogen peroxide type solvents are used here for iron type foreign particles. Specifically, a product "CPL-200" manufactured by Mitsubishi Gas Chemical Co., Inc. may be cited as an example which is used at a solvent temperature in the range from 10 to 40° C.

For aluminum type foreign particles, alkali type solvents such as caustic soda may be used at a solvent temperature in the range from 10 to 80° C. Further, acid type solvents as described above are effective for organic foreign particles, and alcohol such as methanol and butanol and organic solvents such as methylene chloride and normal hexane may be used for fats and fatty oils, each of such solvents is used at a solvent temperature in the range from 10 to 40° C.

The above-described acid, alkali and organic solvents may be used by mixing them appropriately if required, and different types of solvents for dissolving foreign particles may be used alternately when cleaning is repeated a plurality of times. For example, depending on the foreign particles to be cleaned, cleaning may be first performed using an acid type solvent and then using an alkali type solvent. Alternatively, cleaning may be performed using solvents of the same kind, e.g., cleaning may be first performed using a phosphoric acid type solvent and then using an oxalic acid-hydrogen peroxide type solvent.

A fuel injection pipe which has been subjected to cleaning of the inner circumferential surface thereof using a solvent for dissolving foreign particles as described above is thereafter subjected to acid washing, neutralized using "Coolmin #O" (product name) manufactured by Coolmin Chemicals Co., Ltd., and dried to complete the fuel injection pipe.

EXAMPLE

Example 1

Six fuel injection pipes having an outer diameter of 5.0 mm, an inner diameter of 2.0 mm and a wall thickness of 1.5 mm made of JIS G33455 STS 370 obtained through four cycles of pipe-extending process and heat process were subjected to normal degreasing, washing and acid washing processes, and washing was performed on the inner circumferential surfaces thereof for two minutes at the room temperature by passing a solvent for dissolving foreign particles comprising "CPL-200" manufactured by Mitsubishi Gas Chemical Co., Inc. through the pipes. Thereafter, the pipes were subjected to acid washing by passing hydrochloric acid of a concentration of 10 V/V per cent through the pipes for 15 seconds at the room temperature and were then neutralized and dried.

As a result of measurement of cleanness of the inner circumferential surfaces of the high-pressure fuel injection pipes thus obtained, substantially no foreign particles of iron was measured.

Example 2

Six fuel injection pipes having the same dimensions as those in Example 1 made of JIS STS 410 were subjected to degreasing, washing and acid washing as in Example 1. Next, washing was performed on the interior of the pipes for five minutes at a temperature of 70° C. using a solvent for dissolving foreign particles comprising phosphoric acid (70 V/V per cent), sulfuric acid (20 V/V per cent) and chromic acid (a 10 V/V per cent aqueous solution of chromic acid of 500 g/l). Then, the interior of the pipes was subjected to acid washing, neutralized and dried as in Example 1.

As a result of measurement of cleanness of the inner circumferential surfaces of the high-pressure fuel injection pipes thus obtained, substantially no organic foreign particle was measured.

Example 3

The interior of six fuel injection pipes having the same dimensions as those in Example 1 made of JIS STS 480 was washed by passing a solvent for dissolving foreign particles comprising NaOH of a concentration of 10 V/V per cent therethrough for five minutes at the room temperature. Then, the interior of the pipes was subjected to water washing and drying.

As a result of measurement of cleanness of the inner circumferential surfaces of the high-pressure fuel injection pipes thus obtained, substantially no foreign particles of aluminum was measured.

Example 4

The interior of six fuel injection pipes having the same dimensions as those in Example 1 made of JIS STS 370 was washed by passing a solvent for dissolving foreign particles comprising a mixture of normal hexane (96 V/V per cent) and butanol (99 V/V per cent) therethrough for ten minutes at the room temperature. Then, the interior of the pipes was dried.

As a result of measurement of cleanness of the inner circumferential surfaces of the high-pressure fuel injection pipes thus obtained, substantially no foreign particle consisting of fats and fatty oils was measured.

Example 5

Six fuel injection pipes of the same dimensions and material as those in Example 1 were subjected to degreasing, washing and acid washing as in Example 1. Next, a cleaning process similar to that in Example 1 was performed on the interior of the pipes and, thereafter, the interior of the pipes was subjected to acid washing by passing hydrochloric acid of a concentration of 10 V/V per cent therethrough for 15 seconds at the room temperature and was neutralized.

Thereafter, cleaning, acid washing, neutralizing and drying processes as in Example 2 were further performed on the interior of the pipes.

As a result of measurement of cleanness of the inner circumferential surfaces of the high-pressure fuel injection pipes thus obtained, substantially no foreign particle of iron nor foreign particle of an organic substance was measured.

Example 6

Six fuel injection pipes of the same dimensions and material as those in Example 1 were subjected to degreasing, washing and acid washing as in Example 1. Next, a cleaning process similar to that in Example 1 was performed on the interior of the pipes and, thereafter, the interior of the pipes was subjected to acid washing by passing hydrochloric acid of a concentration of 10 V/V per cent therethrough for 15 seconds at the room temperature and was neutralized.

Thereafter, cleaning, water washing, neutralizing and drying processes as in Example 3 were further performed on the interior of the pipes.

As a result of measurement of cleanness of the inner circumferential surfaces of the high-pressure fuel injection pipes thus obtained, substantially no foreign particle of iron nor foreign particle of aluminum was measured.

Example for Comparison:

Six fuel injection pipes of the same dimensions and material as those in Example 1 were subjected to degreasing and washing. The interior of the pipes were subjected to acid washing and, thereafter, the inner circumferential surfaces were blown by air.

As a result of measurement of cleanness of the inner circumferential surfaces of the high-pressure fuel injection pipes thus obtained, considerably large foreign particles of iron were measured and a great number of microscopic foreign particles of aluminum were measured. Further, organic foreign particles in the form of cotton fibers were measured in a considerable quantity.

As described above, the present invention makes it possible to provide a method of manufacturing a high-pressure fuel injection pipe in which various foreign particles are substantially completely eliminated from the inner circumferential surface of a high-pressure fuel injection pipe to prevent the occurrence of clogging of an injection nozzle and to thereby prevent a faulty operation of a diesel engine and damage to a fuel pump.

It should be understood that he foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of manufacturing a small-diameter thick-wall high-pressure fuel injection pipe for use in an internal combustion engine consisting of the steps of performing a plurality of cycles of pipe-extending process and pipe heating process, and after performing a final of said cycles of pipe-extending process and pipe heating process, performing steps of cleaning and removing at least a first type of minute foreign particles present from outside sources and adhering to the inner circumferential surfaces of the pipe, by applying to said surfaces a first solvent for dissolving the first type of foreign particles adhered to the inner circumferential surfaces of the pipe and then cleaning and removing at least a second type of minute foreign particles present from outside sources and adhering to the inner circumferential surfaces of the pipe by applying to said surfaces at least a second solvent for dissolving the second type of foreign particles adhered to the inner circumferential surfaces of the pipe, wherein the first and second solvents are different from one another.

2. A method of manufacturing a high-pressure fuel injection pipe according to claim 1, wherein said solvent for dissolving foreign particles is a solvent selected from the group consisting of alkaline and organic solvents.

3. A method of manufacturing a high-pressure fuel injection pipe according to claim 1, where phosphoric acid solvents and oxalic acid-hydrogen peroxide solvents which are acid solvents are used for dissolving iron foreign particles at a solvent temperature in the range from 10 to 40° C.

4. A method of manufacturing a high-pressure fuel injection pipe according to claim 1, wherein caustic soda is used as a solvent for dissolving aluminum foreign particles.

5. A method of manufacturing a high-pressure fuel injection pipe according to claim 1, wherein phosphoric acid solvents and oxalic acid-hydrogen peroxide solvents which are acid solvents are used for dissolving organic foreign particles.

6. A method of manufacturing a high-pressure fuel injection pipe according to claim 1, wherein alcohol or organic solvent is used for dissolving foreign particles of fats and fatty oils.

7. A method of manufacturing a high-pressure fuel injection pipe according to claim 1, wherein the pipe has a diameter in a range of 4.5 mm to 20.0 mm and wherein the pipe has a wall thickness in a range of 1.5 mm to 8.0 mm.

8. A method of manufacturing a high-pressure fuel injection pipe according to claim 2, wherein phosphoric acid solvents and oxalic acid-hydrogen peroxide solvents which are acid solvents are used for dissolving iron foreign particles at a solvent temperature in the range from 10 to 40° C.

9. A method of manufacturing a high-pressure fuel injection pipe according to claim 2, wherein caustic soda is used as a solvent for dissolving aluminum foreign particles.

10. A method of manufacturing a high-pressure fuel injection pipe according to claim 2, wherein phosphoric acid solvents and oxalic acid-hydrogen peroxide solvents which are acid solvents are used for dissolving organic foreign particles.

11. A method of manufacturing a high-pressure fuel injection pipe according to claim 2, wherein alcohol or an organic solvent is used for dissolving foreign particles of fats are fatty oils.

* * * * *